(12) United States Patent
Graves et al.

(10) Patent No.: US 11,353,393 B2
(45) Date of Patent: Jun. 7, 2022

(54) COUPLING LINK WITH INTEGRATED BEAM BLOCKING AND A BEARING ASSEMBLY USING AN AXIAL PRELOADING TECHNIQUE

(71) Applicant: VIAVI SOLUTIONS INC., San Jose, CA (US)

(72) Inventors: Jeffery Stephen Graves, Oxford Station (CA); Elias Debs, Ottawa (CA); Darko Cugalj, Ottawa (CA); Christopher Russell Wagner, Kanata (CA); Driss Touahri, Nepean (CA)

(73) Assignee: VIAVI SOLUTIONS INC., San Jose, CA (US)

( * ) Notice: Subject to any disclaimer, the term of this patent is extended or adjusted under 35 U.S.C. 154(b) by 183 days.

(21) Appl. No.: 16/900,519

(22) Filed: Jun. 12, 2020

(65) Prior Publication Data
US 2021/0389232 A1  Dec. 16, 2021

(51) Int. Cl.
*G01N 21/01* (2006.01)
*G01J 3/02* (2006.01)

(52) U.S. Cl.
CPC ............ *G01N 21/01* (2013.01); *G01J 3/0205* (2013.01); *G01N 2021/0112* (2013.01)

(58) Field of Classification Search
CPC  G01N 21/01; G01N 2021/0112; G01J 3/0205
See application file for complete search history.

(56) References Cited

U.S. PATENT DOCUMENTS

2018/0334125 A1* 11/2018 Thiele ................. F16H 25/2454

* cited by examiner

*Primary Examiner* — Que Tan Le
*Assistant Examiner* — Don J Williams
(74) *Attorney, Agent, or Firm* — Mannava & Kang, P.C.

(57) ABSTRACT

An apparatus for providing an improved coupling link with integrated beam blocking and a bearing assembly using an axial preloading technique is disclosed. The apparatus may include a coupling link comprising a first end, a second end, and a middle section. The middle section may be connectable to a beam blocking element. The first end may include a first bearing assembly and may be connectable to a motor drive arm. The second end may include a second bearing assembly and may be connectable to an optical-mechanical element. In some examples, the apparatus may be used in various optical measurement and testing applications and environments. In some examples, the improved coupling link may also utilize an axial preloading technique to minimize excessive movement in bearings assemblies.

20 Claims, 11 Drawing Sheets

```
┌─────────────────────────────────────────────────────────────┐
│ ADHERE, USING A FIRST ADHESIVE, INNER RACES OF BEARINGS     │
│ TO A SHAFT                                                  │
│ 401                                                         │
└─────────────────────────────────────────────────────────────┘
                              │
                              ▼
┌─────────────────────────────────────────────────────────────┐
│ ADHERE, USING A SECOND ADHESIVE, OUTER RACES OF BEARINGS    │
│ TO AN UPPER ARM OF A FLEXURE ARM                            │
│ 402                                                         │
└─────────────────────────────────────────────────────────────┘
                              │
                              ▼
┌─────────────────────────────────────────────────────────────┐
│ APPLY DEAD WEIGHT TO A LOWER FLEXURE ARM OF THE FLEXURE ARM │
│ WHILE SUPPORTING LOWER BEARINGS                             │
│ 403                                                         │
└─────────────────────────────────────────────────────────────┘
                              │
                              ▼
┌─────────────────────────────────────────────────────────────┐
│ PLACE A THIRD ADHESIVE BETWEEN LOWER BEARING OUT RACE AND   │
│ LOWER FLEXURE ARM                                           │
│ 404                                                         │
└─────────────────────────────────────────────────────────────┘
                              │
                              ▼
┌─────────────────────────────────────────────────────────────┐
│ REMOVE THE DEAD WEIGHT FROM THE LOWER FLEXURE ARM           │
│ 405                                                         │
└─────────────────────────────────────────────────────────────┘
```

COUPLING LINK WITH INTEGRATED BEAM BLOCKING AND A BEARING ASSEMBLY USING AN AXIAL PRELOADING TECHNIQUE

TECHNICAL FIELD

This patent application is directed to optical measurement instrumentation for telecommunication networks, and more specifically, to an improved coupling link with integrated beam blocking and a bearing assembly using an axial preloading technique.

BACKGROUND

Optical measurement instrumentation, such as optical spectrometers or optical spectrum analyzers (OSAs), play an important role in modern scientific research. Optical spectrum analyzers (OSAs), in particular, are vital in fiber-optics and optical communication technologies. From research and development (R&D) applications to manufacturing, optical spectrum analyzers (OSAs) and other similar equipment have become essential to build and characterize a variety of fiber-optics products, such as broadband sources, optical sources, and wavelength division multiplexed (WDM) systems.

BRIEF DESCRIPTION OF DRAWINGS

Features of the present disclosure are illustrated by way of example and not limited in the following Figure(s), in which like numerals indicate like elements, in which.

DETAILED DESCRIPTION

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

There are many types of optical spectrum analyzers (OSAs), such as Fabry-Perot-based, interferometer-based, and swept coherent heterodyne optical spectrum analyzers (OSAs). However, one of the most common optical spectrum analyzers (OSAs) for fiber-optics applications includes diffraction grating based optical spectrum analyzers (OSAs). These analyzers may also be commonly referred to as monochromator-based optical spectrum analyzers (OSAs).

A technical issue with some optical spectrum analyzers (OSAs) may include their ability to obtain accurate and reliable optical measurements. Accuracy and reliability, for instance, may be affected by any number of optical or mechanical components of an optical spectrum analyzer (OSA). For example, deficiencies in a drive mechanism, such as adverse or excessive movements in one or more components, and/or drive motor variability caused by various additional components in such systems may, individually or collectively, hamper accuracy or consistency of optical measurements. It should be appreciated that other factors, such as free movement, friction, or other mechanical factors, may also adversely affect measurement accuracy.

The apparatuses, systems and methods described herein, however, may help minimize or eliminate these deficiencies without significantly altering existing optical spectrum analyzer (OSA) designs and/or configurations of components. The apparatuses, systems and methods described herein, among other things, may provide an improved drive mechanism with integrated beam blocking and/or an axial preloading configuration or technique to minimize excessive movement in bearings assemblies. In this way, these systems and methods may help provide more precise and consistent optical measurements using the mechanical solutions and processes as described herein. These and other benefits and advantages may be apparent in the descriptions and examples outlined below.

Figure 1:
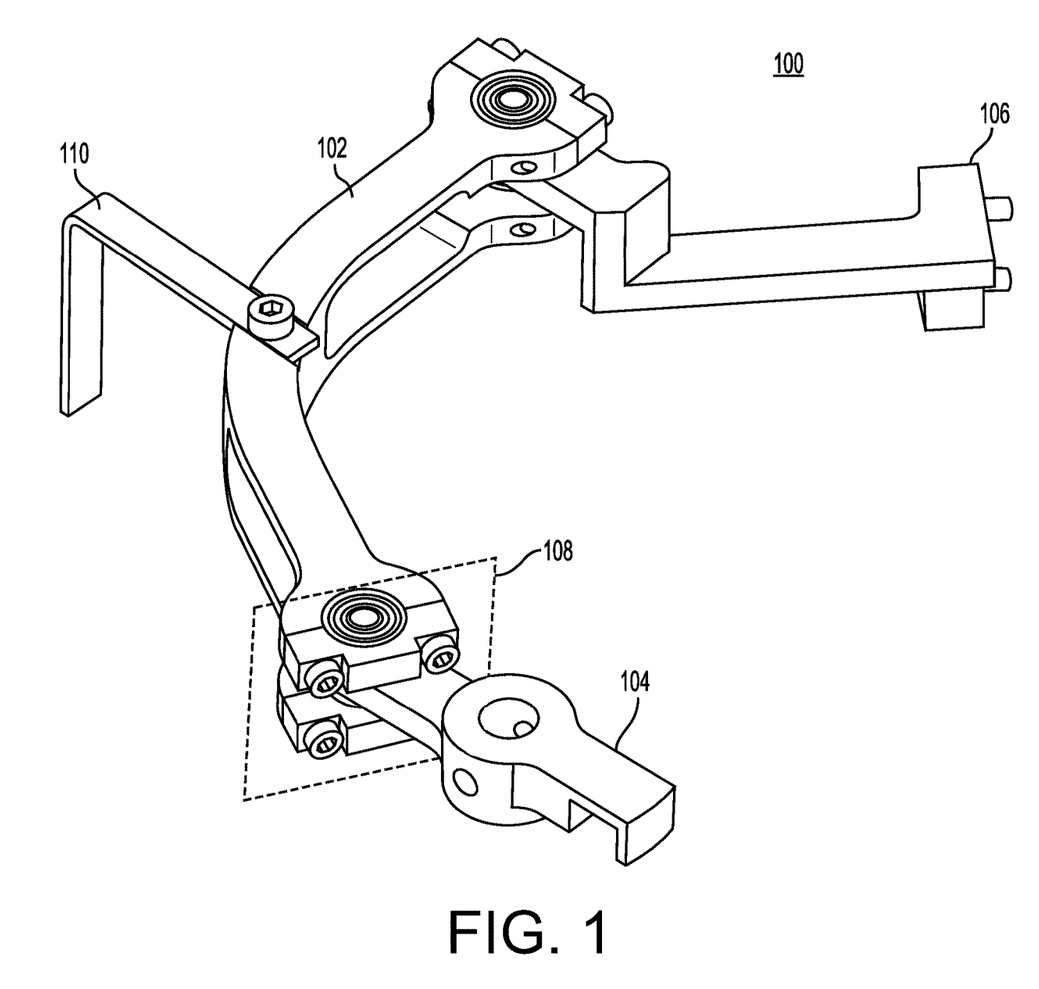
FIG. 1 illustrates an apparatus having an improved drive mechanism having a coupling link with integrated beam blocking element and a bearing assembly using an axial preloading technique, according to an example.

FIG. 1 illustrates an apparatus 100 having an improved coupling link (or intermediate link) 102 with an integrated beam blocking element 110 and a bearing assembly 108, according to an example. As shown, the coupling link 102 may be connected to any number of optical, electrical, and/or mechanical components, such as a motor drive element 104 and an output link 106, which in turn may be coupled to an axle (not shown). The motor drive element 104 may be attached to a motor (not shown), which may cause the motor drive element 104 to rotate, thus causing the entire coupling link 102 to actuate or move in a coordinated fashion, as described in more detail below. The output link 106 may be connected to a variety of components as well. In some examples, the output link 106 may be connected to a retroreflective element (not shown), which may retroreflect an optical beam to or from other various optical elements in an optical measurement system, such as an optical spectrum analyzer (OSA). These various optical elements may include, among other things, grating elements, reflectors, mirrors, optical fibers, etc.

In some examples, the bearing assembly 108 may use ball bearings, which typically have a slight amount of clearance between balls and raceways. In an optical measurement system, such as an optical spectrum analyzer (OSA), these small gaps around the balls may allow movement at the bearing assembly 108. The reason for looseness in the bearing assembly 108 may be designed to allow the bearings to rotate or move fluidly and smoothly. However, such looseness may also affect performance of the bearing assembly 108 in certain applications. For instance, when the looseness or movement is excessive, there may be too much radial and axial play in the bearings, which may reduce precise movements required for obtaining accurate optical measurements. Although the bearing assembly 108 is shown at only one end of the coupling link 102 for connecting any number of optical, electrical, and/or mechanical components, such as a motor drive element 104, it should be appreciated the bearing assembly 108 may also be similar provided on the other end of the coupling 104 for connecting to the output link 106, as shown. Thus, a bearing assembly 108 using an axial preloading configuration or technique may help obviate these issues at either or both ends of the coupling link 102, as described with more detail with respect to FIGS. 3A-3E below.

The beam blocking element 110, in some examples, may be an actuation component that is integrated to the coupling link 102. The beam blocking element 110 may be made of a variety of opaque materials, such as metal, plastic, etc. For example, the beam blocking element 110 may be made of metals, such as aluminum (e.g., 5052-H32 aluminum sheet, etc.), steel, copper, brass, etc. It should be appreciated that any opaque material may be used. This may include any non-metallic material as well, such as a plastic, fiberglass, (opaque) glass, etc. As described in more detail below, the beam blocking element 110 may be positioned in such a way as to block, reflect, and/or allow passage of an optical beam when the motor drive element 104 is rotated by the motor (not shown) at a particular angle or position. In some examples, blocking an optical beam at certain points during movement of the actuation components may be helpful in obtaining optical measurements. It should be appreciated that one of the primary purposes of blocking incoming light may be to perform a dark level measurement on the photodetector, which may then be compensated for in any measurement algorithm. By integrating the beam blocking element 110 on the coupling link 102, a separate beam blocking drive element may not be required, as is the case for most conventional systems. In this way, there may be less crowding of components, fewer distinct moving parts that may result in better coordination, and other notable benefits. The beam blocking element 110 will be described with more detail with respect to FIGS. 5A-5D below.

The coupling link 102 may also be formed and made from a variety of materials. For instance, these may include any variety of elastic material. In some examples, this may include stainless steel, e.g., 17-4 PH stainless steel, etc. It should be appreciated that due to thermal expansion considerations, a wide variety of metallic or non-metallic materials may be used to construct the coupling link 102. As shown, the coupling link 102 may provide support and interconnectivity for the bearing assembly 108 and/or the output link 106 at each end of the coupling link 102 (which may also utilize a bearing assembly), and provide an attachment point for the beam blocking element 110. As described in more detail herein, the coupling link 102 may be designed with a flexure arm configuration, which may be configured to facilitate axial preloading of the bearings, therefore enhancing slop-free movement and ultimately provide precise movements in order to better obtain accurate and reliable optical measurements. These improvements, individually or collectively, help provide an improved drive mechanism with integrated beam blocking, which overcomes the shortcomings of various conventional solutions.

Figure 2A:
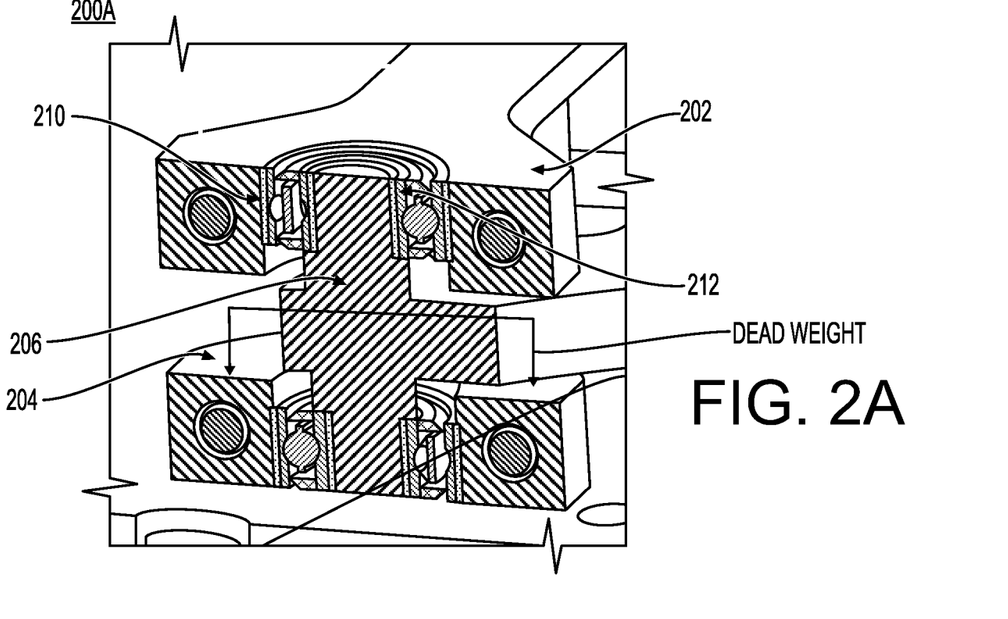
FIGS. 2A-2B illustrate a bearing assembly using an axial preloading technique, according to an example.
Figure 2B:
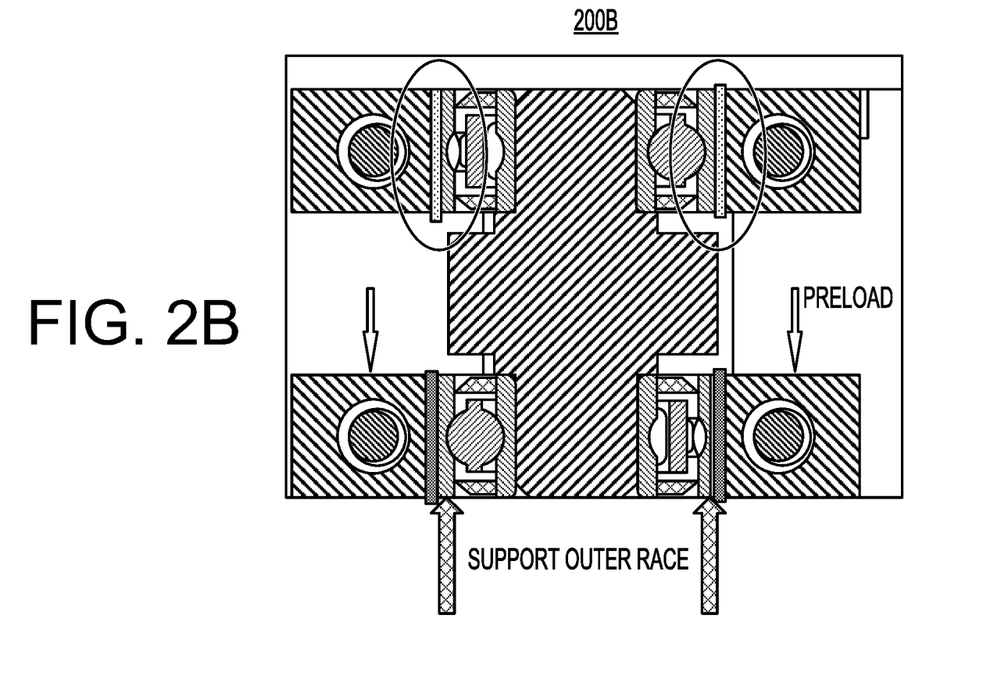

As described above, the bearing assembly 108 may be configured to minimize undue or excessive movement or looseness in the bearings and raceways in order to obtain precise movements required for accurate optical measurements. FIGS. 2A-2B illustrate a bearing assembly 108 using an axial preloading technique, according to an example. FIG. 2A illustrates a perspective view 200A of a cross section of the bearing assembly 108, and FIG. 2B illustrates a cross-sectional view 200B of the bearing assembly 108.

In the perspective view 200A, the bearing assembly 108 may include an upper flexure arm 202 and a lower flexure arm 204, both of which may be extensions of the coupling link 102 of FIG. 1. The upper flexure arm 202 and the lower flexure arm 204 may be configured to fit a shaft 206. In some examples, the shaft 206 may be a part of the motor drive element 104, the output link 106, and/or other optical-mechanical component or element. The bearing assembly 108 may allow ball bearings 208a-208d with move within respective bearing, each bearing having an outer race 210 and an inner race 212. It should be appreciated that dead weight may be placed on the lower flexure arm 204 while the bearing assembly is supported by the outer race of the lower bearing as shown in FIG. 2A. By virtue of this configuration and/or function of the bearing assembly 108 when connected with one or more optical-mechanical components or elements, stress or strain may be caused in the bearing assembly 108. One key objective of the bearing assembly 108, as described herein, may be to eliminate or reduce any excessive or unnecessary play in the bearing assembly 108, especially during movement or rotations. It should be appreciated that dead weight and any preload force may effectively be the same. In other words, application of dead weight (where preload is shown in FIG. 2B) may case deflection of the flexure arms which generates preload force.

Figure 3A:
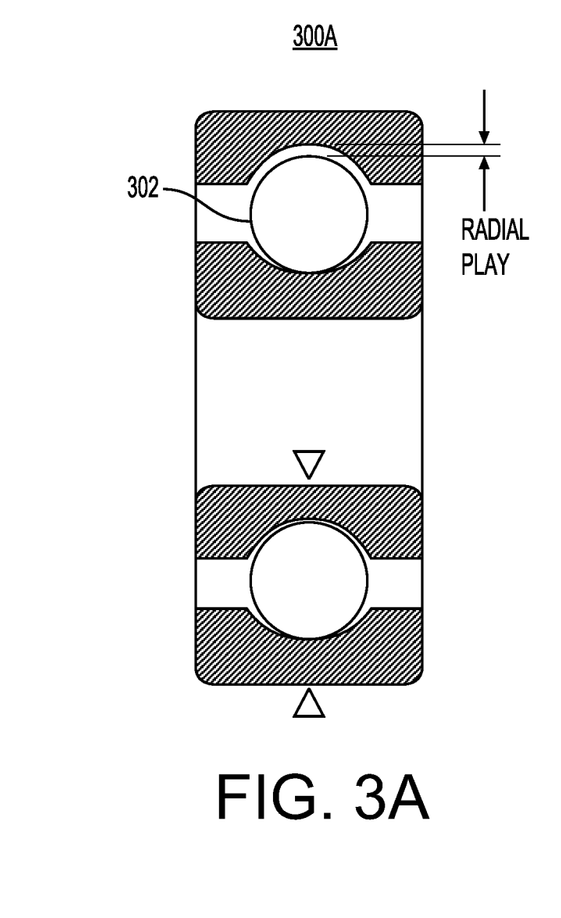
FIGS. 3A-3E illustrate configurations for ball and raceways in a bearing assembly, according to an example.
Figure 3B:
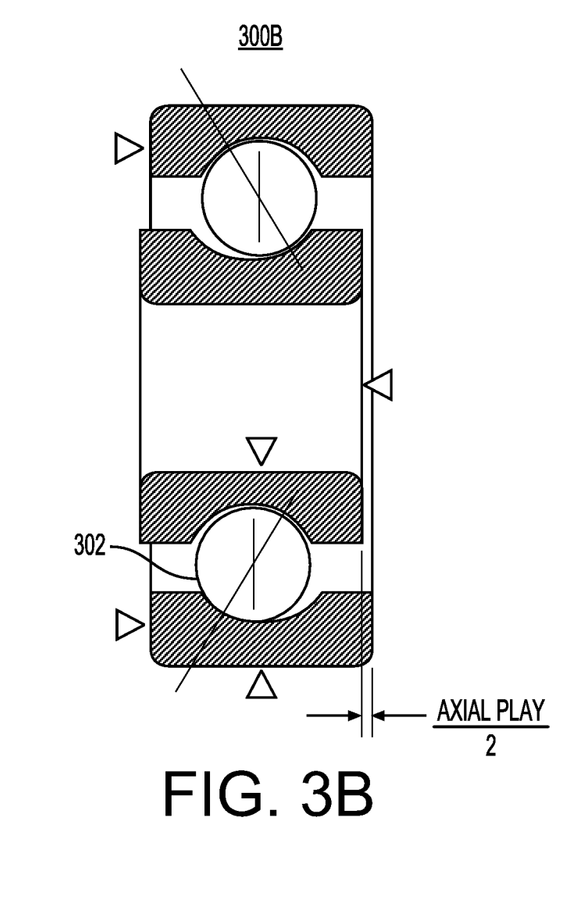

FIGS. 3A-3E illustrate configurations for ball and raceways in a bearing assembly, according to an example. As shown in FIG. 3A, there may be radial play between the ball bearing 302 and the outer/inner race. Here, the ball bearing 302 may be closer to one race and therefore provide a larger gap that causes excessive radial play. As shown in FIG. 3B, there may also be axial play between the ball bearing 302 and the outer/inner race. Here, if the inner race, for example, moves in one direction (e.g., by gravitation force or other force), this may cause the ball bearings 302 to rotate and such a configuration would result in excessive axial play. Again, some radial and/or axial play may help allow more fluid movement. That said, when there is too much space or movement, such play may be excessive, which may adversely impact measurements.

Figures 3C, 3D:
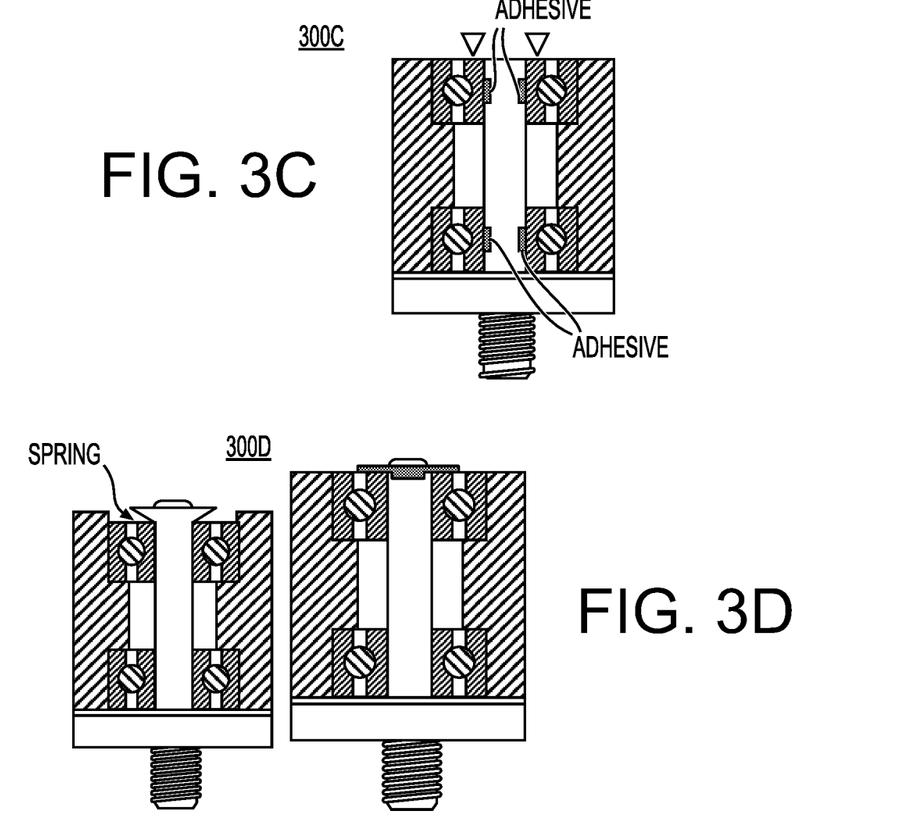

Again, as described above, dead weight may be applied to the lower flexure arm 202 to cause defection of (strain in) the flexure while the lower bearing is secured (via adhesive or other means). In other words, the deflection may continue to apply an axial load to the bearing after the dead weight has been removed.

Figure 3E:
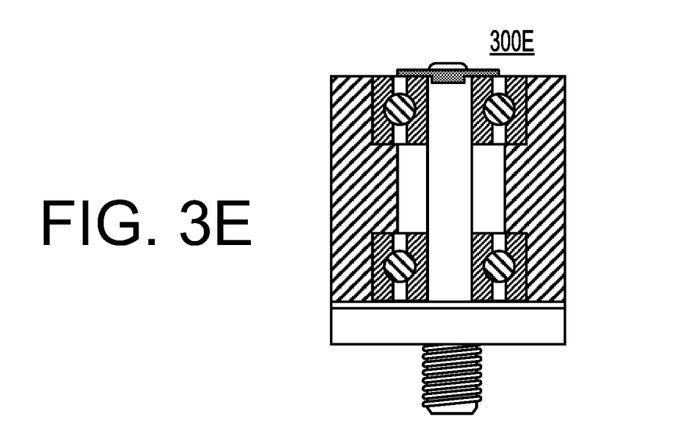

FIG. 3D illustrates use of a spring, for example, to press inner rings together or outer races apart. The spring may introduce minimal stiffness since the spring can move after assembly so that the stiffness of the final assembly may be controlled by the spring rate rather than the raceway-ball elasticity. The benefits of a spring may be readily apparent. For example, thermal effects from relative expansion of mating parts may be minimized by use of a spring, and a spring preload may be advantageously used in some high-speed applications. FIG. 3E illustrates use of a clamping technique. As shown, a clamp may be machined to precise dimensions to remove axial play when the races are clamped together. Although a clamp may be relatively easy to assemble and insert, getting the exact and precise measurements and dimensions may be difficult to achieve in practice.

Referring back to FIGS. 2A and 2B, a bearing assembly 108 using an axial preloading technique may be provided. In some examples, this axial preloading technique may help obviate issues associated with radial and axial play. In this way, flexure arms may be used for bearing preload to provide a more secure fit and reduce looseness or movement.

It should be appreciated that in some examples applying Loctite, or other similar adhesive to the inner and outer races may eliminate relative movement between the races and links.

Figure 4:
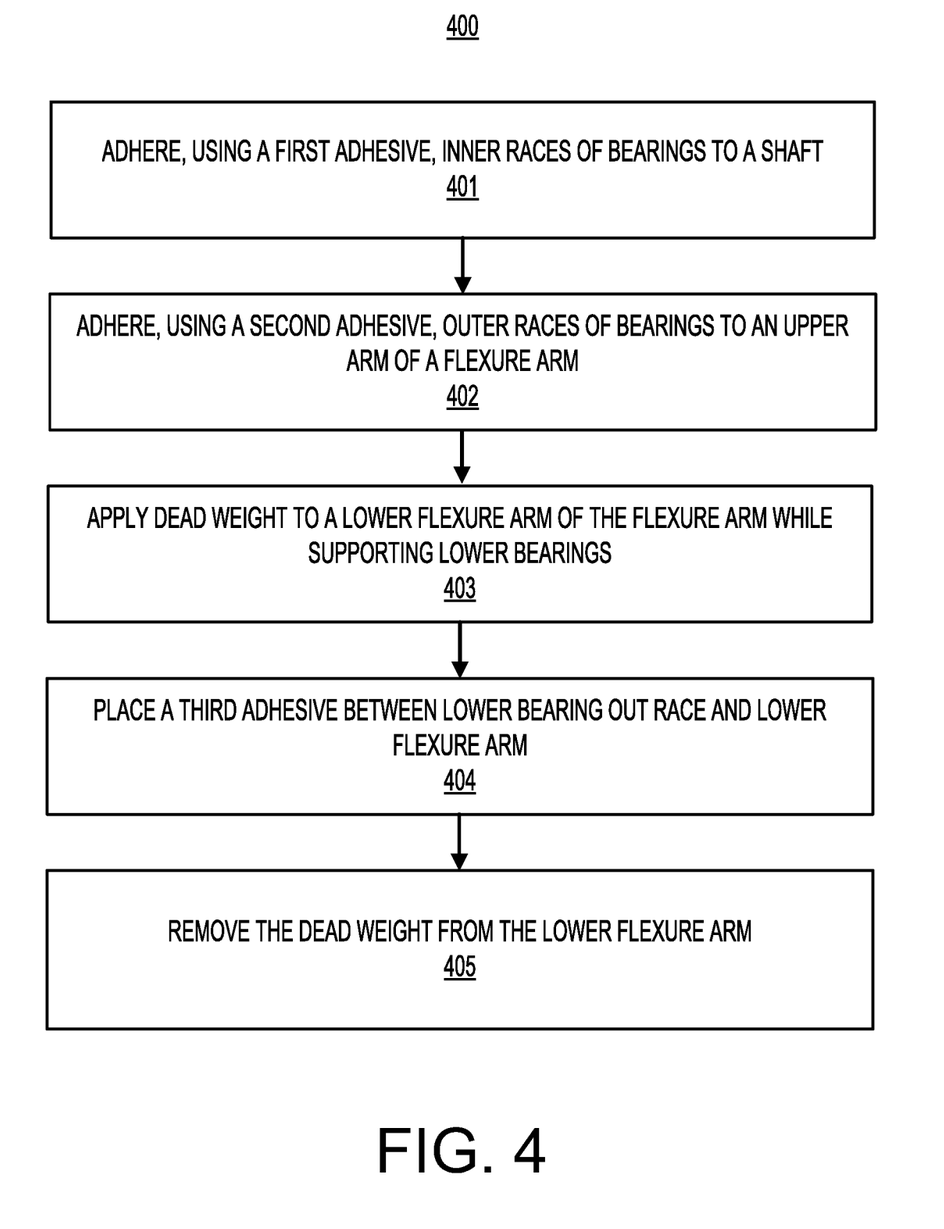
FIG. 4 illustrates a flow chart of a method for providing bearing preload, according to an example.

FIG. 4 illustrates a flow chart of a method 400 for providing bearing preload, according to an example. The method 400 is provided by way of example, as there may be a variety of ways to carry out the method described herein. Although the method 400 is primarily described as being performed at the apparatus 100 of FIG. 1 and/or the bearing assembly 108 of FIGS. 2A-2B, the method 400 may be executed or otherwise performed by one or more processing components of another system or a combination of systems. Each block shown in FIG. 4 may further represent one or more processes, methods, or subroutines, and one or more of the blocks may include machine readable instructions stored on a non-transitory computer readable medium and executed by a processor or other type of processing circuit to perform one or more operations described herein.

At block 401, inner races 212 of bearing may be adhered to the shaft. This may be achieved by using any number of adhesives, such as glue or other adhesive. It should be appreciated that several types of adhesive materials may be used. In general, any adhesive that is capable of fixing the inner race 212 to the shaft 206 may be used. In some examples, a bearing-retaining compound from Loctite may be used. It should be appreciated, however, that the inner races 212 may be press fit to the shaft 206, the shaft 206 may be split to form an expanding arbor or any number of adhesives or epoxies could be used.

At block 402, outer races 210 of bearing may be adhered to the upper flexure arm 202 of the coupling link 102. Again, this may be achieved by using any number of adhesives, such as glue or other adhesive. The adhesive used here may be same, similar, or different from the adhesive used for adhering the inner races 212 of bearing to the shaft. In some examples, a bearing-retaining compound from Loctite may be used. Like the inner race 212 above, it should be appreciated that any adhesive may be used to fix the outer race 210 to the coupling link 102 may be used.

At block 403, dead weight may be applied to the lower arm 204 while supporting the lower bearing. For example, a fixture may be provided to support the outer race 210 of the lower bearing on a post (as shown by cross-hatched upward arrows in FIG. 2B), and a weight (preload) may be hung from the surface of the lower flexure arm 204 (as shown by white downward arrows in FIG. 2B).

At block 404, another adhesive may be applied between lower bearing outer race and the lower flexure arm. This adhesive, for example, may be Loctite or other similar adhesive, sealant, or treatment. In some examples, the adhesive, use here or elsewhere, may include any number of materials, such as acrylic, anaerobic, cyanoacrylate, epoxy, silicone, urethane, or other materials. Some methods or processes used may include, among other things, hot melt and UV/light curing technologies, etc. Again, the adhesive used here may be same, similar, or different from the adhesive used for adhering the inner/outer races of bearing to the shaft described above.

At block 405, once the adhesive is cured or secured, the dead weight may be removed and any bending induced by the dead weight may apply an appropriate preload on the bearings. It should be appreciated that the applied dead weight may be any desired weight. In general, the dead weight applied may reflect the weight expected to be placed on the coupling link 102 without it. In other words, the applied dead weight may mimic the weight or strain expected on the coupling link 102 and the axial preloading technique may be one solution to compensate or counteract those strains.

The benefits of using this preloading technique may include, among other things, reduced axial or radial play in the bearings assembly 108, a more controlled preload, improved wear compensation, and compact design where no additional mechanical components are required. Although the preloading technique is primarily described with respect to bearings assembly 108, it should be appreciated that this or other similar preloading techniques may be applied to any connecting area of any number of systems or apparatuses that utilize bearings to reduced axial or radial play. These systems or apparatuses may include, for example, the OSA shown and described herein and with respect to any number of connecting ends found in the coupling link 102 or other electrical, mechanical, or optical components.

Figure 5A:
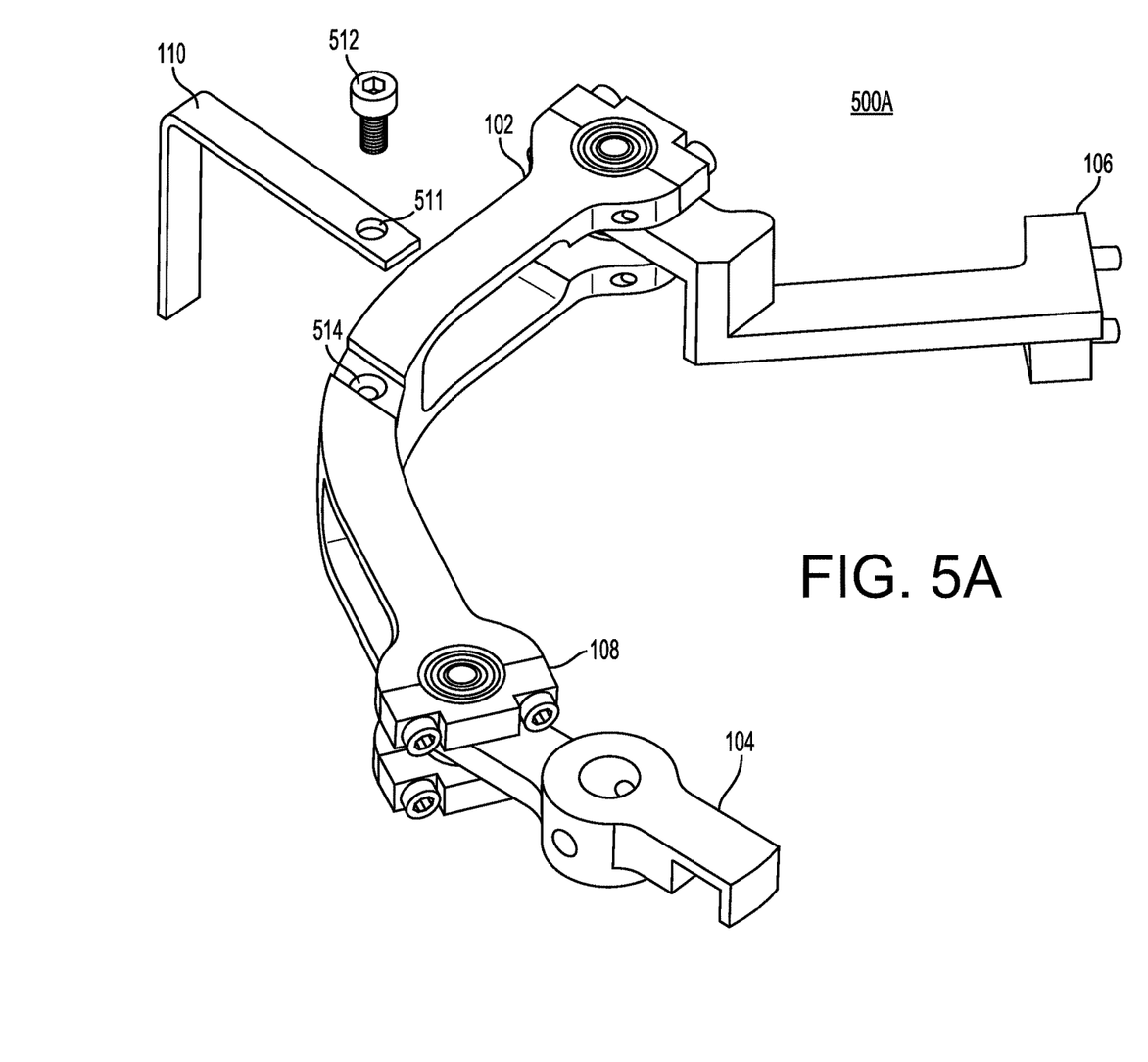
FIGS. 5A-5D illustrate an integrated beam blocking element and drive mechanism, according to an example.
Figure 5B:
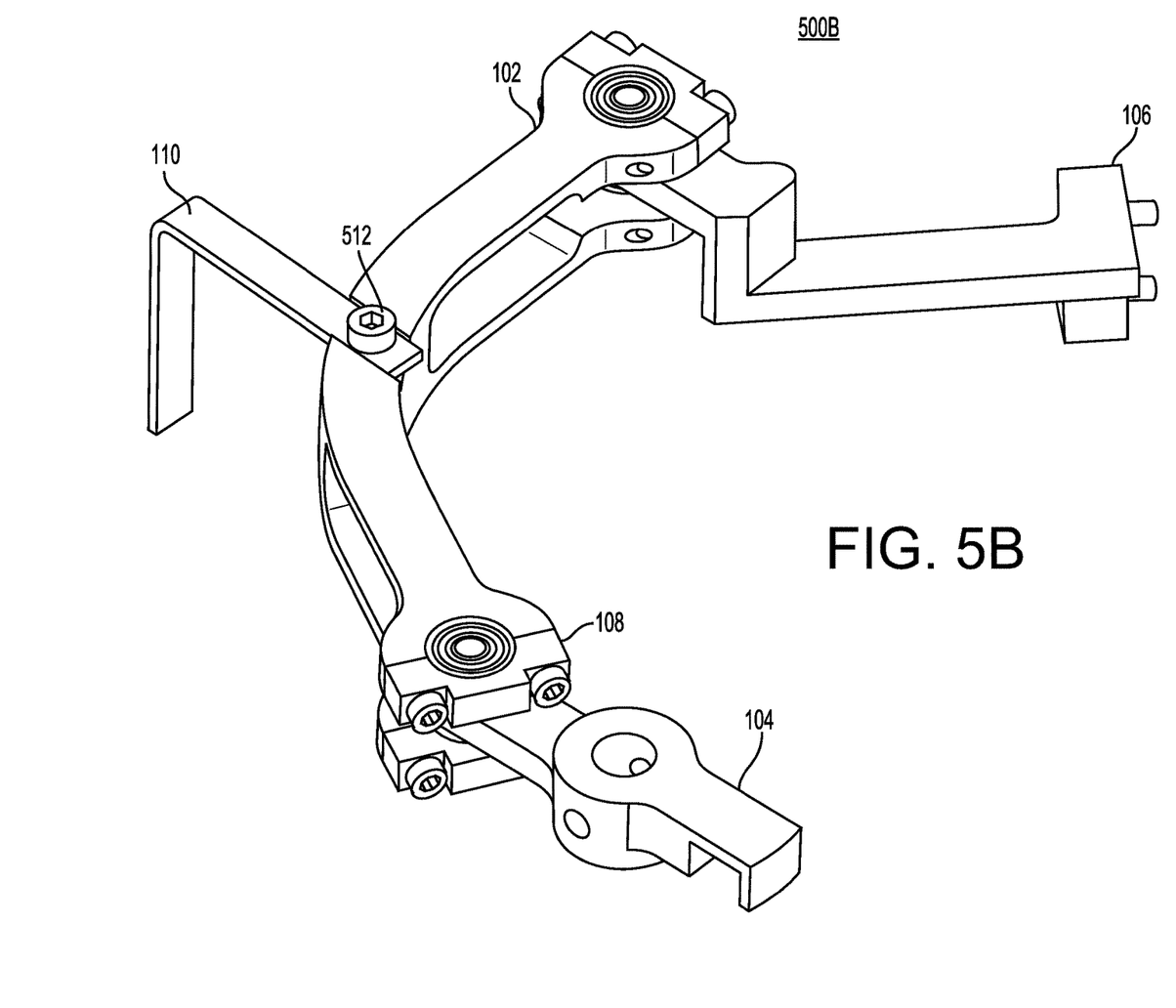

FIGS. 5A-4D illustrate an integrated beam blocking element 110 and drive mechanism, according to an example. FIG. 5A illustrates a coupling link 102 with a disengaged beam blocking element 110, according to an example. In some examples, the beam blocking element 110 may have a hole 511, which when aligned with a coupling link hole 514, may be attached to the coupling link 102 using an attachment 512, such as a screw (as shown) or other similar fastening mechanism (e.g. clamp, adhesive, etc.). FIG. 5B illustrates a coupling link 102 with the integrated beam blocking element 110, similar to FIG. 1.

In some apparatuses or systems, a dedicated beam block drive may be used to block an optical signal. However, the integrated beam blocking element 110 shown in FIGS. 5A-5B may eliminate use of any additional drive mechanisms by integrating the beam block element 110 directly onto the coupling link 102, as shown. In some examples, this may be achieved by connecting the beam block element 110 directly in a middle portion of the coupling link (or intermediate link) 102. In this way, beam blocking may effectively be provided as a strut-element that moves with actuation of an optical spectrum analyzer (OSA), obviating the need for another drive mechanism and/or other cumbersome or moving parts, as seen in some conventional optical measurement systems.

Figure 5C:
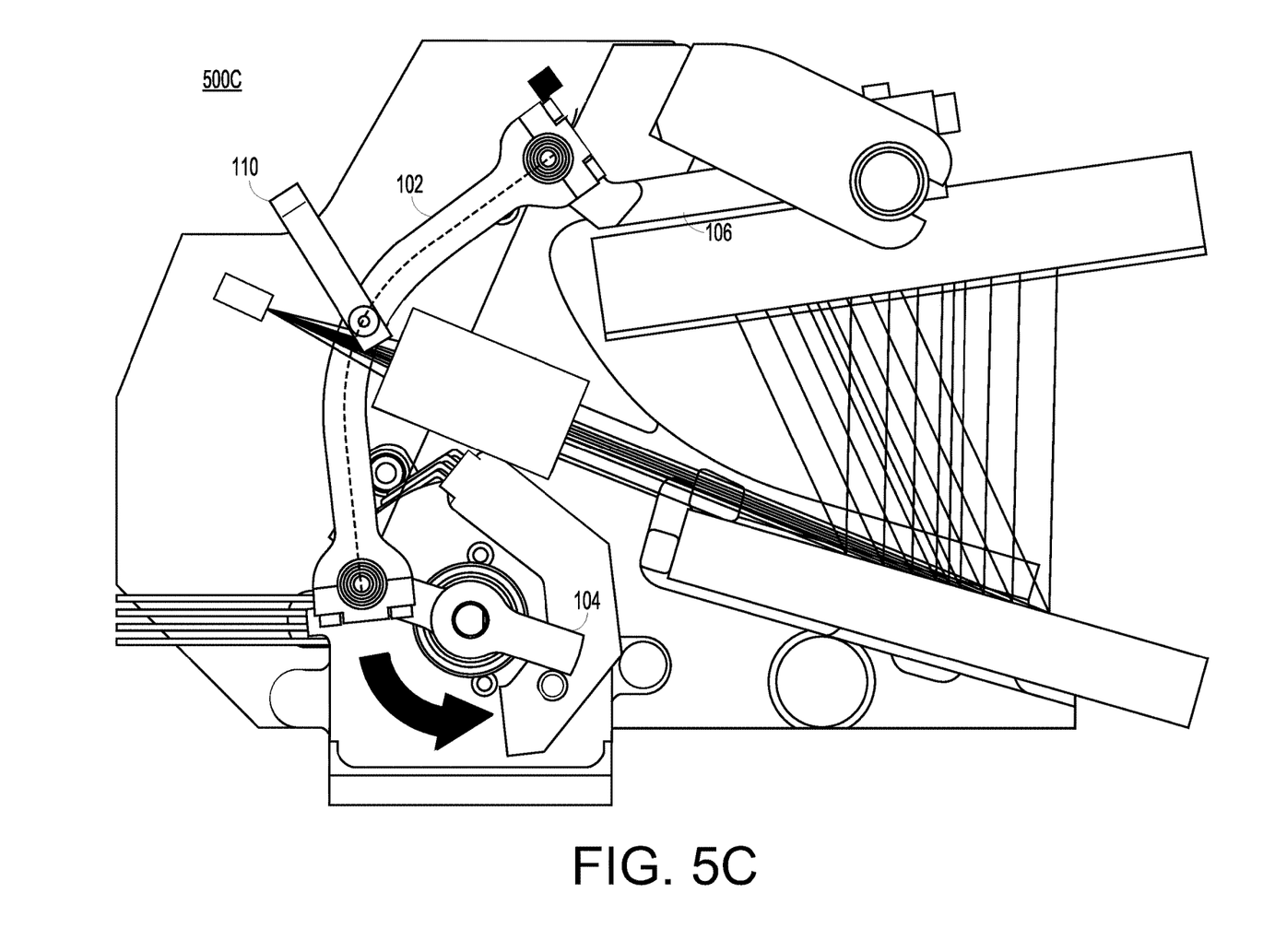
Figure 5D:
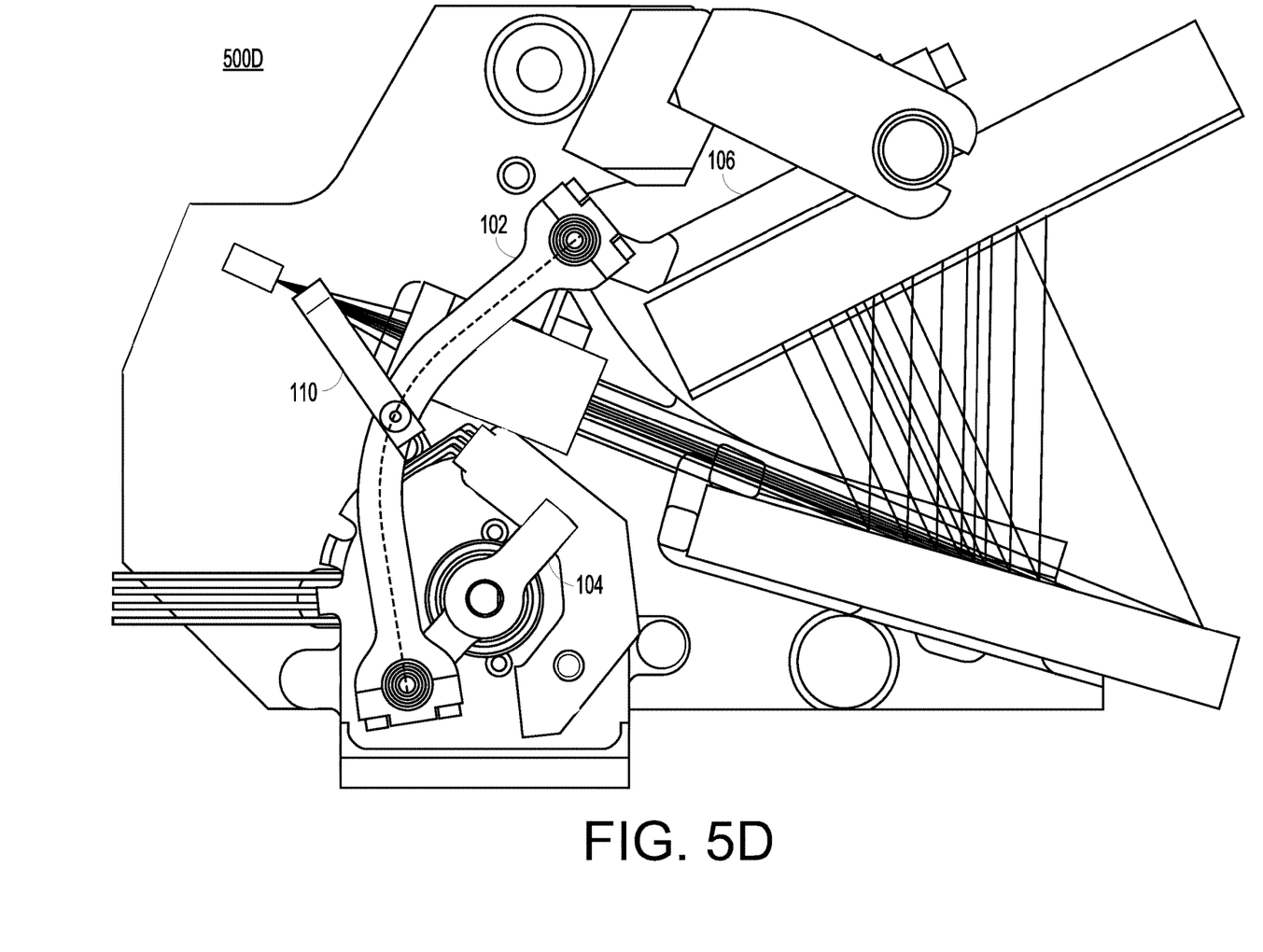

FIG. 5C illustrates an integrated beam blocking element 110 and drive mechanism, according to an example. As shown, the integrated beam blocking element 110 may move, based on movement of the drive mechanism (as shown by the black arrow), into a position such that the optical beam is not blocked. The beam blocking element 110, here, may allow passage of the optical beam. In this way, the optical beam may pass through the various optical elements accordingly (e.g., for optical measurement at any number of photodetectors (not shown)). FIG. 5D illustrates an integrated beam blocking element 110 and drive mechanism, according to an example. As shown, drive mechanism may move (according to the black arrow of FIG. 5C) and thereby rotate the entire coupling link 102, including the integrated beam blocking element 110, into a position that blocks the optical beam. It should be appreciated that, in some examples, the beam blocking element 110, if made of reflective material or coated with reflective coating, may additionally or alternatively reflect the optical beam.

The benefits of integrating the beam blocking element 110 onto the coupling link 102 may include, among other things, elimination of any additional drive mechanisms for separate or distinct beam blocker. Furthermore, an integrated beam blocking element 110 may better control scattering angle of a blocked beam, and, in some scenarios, send separate beam-block element for optical surface preparation and coating. Having more control and minimizing any complicated coordination of many components not only reduces complexity, but may improve accuracy and reliability of optical measurements.

Figure 6A:
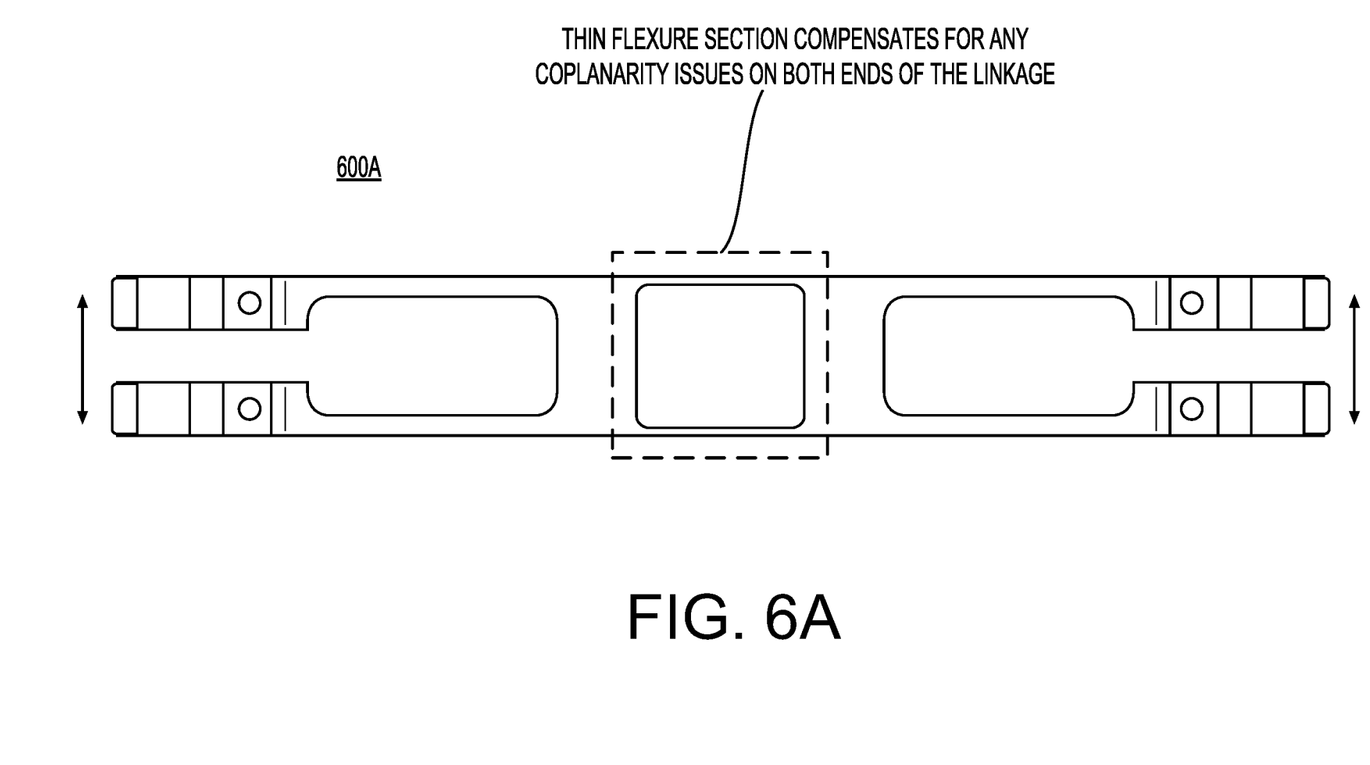
FIGS. 6A-6B illustrate an improved coupling link 602 incorporating a parallel beam flexure configuration 600A.
Figure 6B:
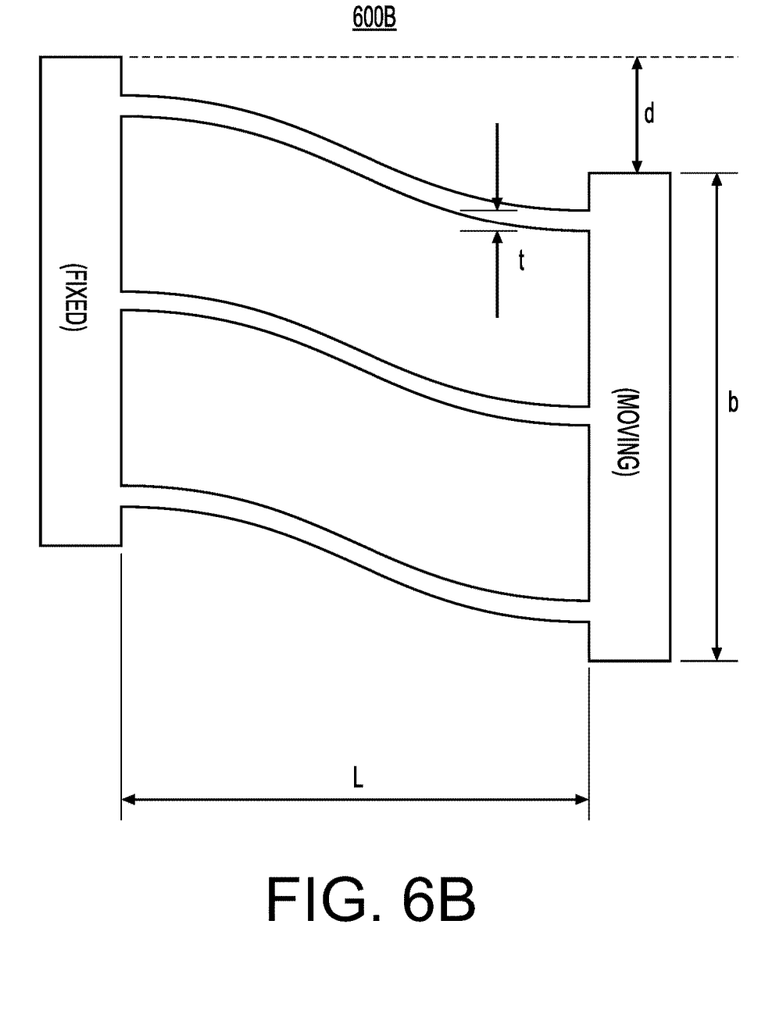

FIGS. 6A-6B illustrate an improved coupling link 602 incorporating a parallel beam flexure configuration 600A. At times, a 4-bar linkage may experience issues associated with coplanarity and parallelism at the linkage's pivot points. For example, play in these pivot points may be compromised or sacrificed a bit at the expense of accuracy, as shown in FIG. 6B (e.g., a parallel beam flexure consisting of 3 beams in a deflected state). A 4-bar linkage mechanism with preloaded pairs of bearings at each end of the intermediate link may represent an over-constrained mechanism. In other words, such a link may be dependent on all four (4) joint axes being parallel as well as driving and driven links to be installed in a axial position to prevent binding of the mechanism and excess loads on the bearings. Thus, flexure in the center of the intermediate link may provide some compliance in the joint axis direction to compensate for a small amount of misalignment due to manufacturing tolerances.

However, as shown in FIG. 6A, the interlink configuration 600A may use a flexure design or configuration which is rigid in one dimension so as to provide slop-free movement. In some examples, a concept and procedure to couple an actuator mechanism and a rotating element (e.g., a retroreflector), and compliant in another dimension, may allow for small center-line to center-line deviation. In applications requiring zero play in the pivot points, this may become a significant issue due the fact that more binding/excessive forces are typically transmitted into the bearings (pivot points), which may thereby cause accelerated wear and/or failure. Thus, the flexure design or configuration, as shown in 600A, may help accommodate small coplanarity deviations between fixed linkage-points, which may ultimately enable benefits of a 4-bar linkage, without generating and transmitting excessive forces into the pivot-point bearings. In this way, use of a parallel flexure in the coupling link of a 4-bar mechanism may help account for (or reduce) any misalignment in the bearings (pivot points).

The benefits of this parallel beam flexure design and configuration, for example, may include, among other things, reduced force on bearing, which not only reduce wear but also provides a self-adjusting design that better maintains structural integrity for more reliable optical measurements and results.

As mentioned above, there may be numerous ways to configure, provide, manufacture, or position the various optical components or elements of the apparatus 100. While examples described herein are directed to certain configurations as shown, it should be appreciated that any of the components described or mentioned herein may be altered, changed, replaced, or modified, in size, shape, and numbers, or material, depending on application or use case, and adjusted for desired resolution or optimal measurement results. In this way, other electrical, thermal, mechanical and/or design advantages may also be obtained.

It should be appreciated that the apparatuses, systems, and methods described herein may facilitate more reliable and accurate optical measurements. It should also be appreciated that the apparatuses, systems, and methods, as described herein, may also include or communicate with other components not shown. For example, these may include external processors, counters, analyzers, computing devices, and other measuring devices or systems. In some examples, this may also include middleware (not shown) as well. Middleware may include software hosted by one or more servers or devices. Furthermore, it should be appreciated that some of the middleware or servers may or may not be needed to achieve functionality. Other types of servers, middleware, systems, platforms, and applications not shown may also be provided at the back-end to facilitate the features and functionalities of the testing and measurement system.

Moreover, single components described herein may be provided as multiple components, and vice versa, to perform the functions and features described above. It should be appreciated that the components of the apparatus or system described herein may operate in partial or full capacity, or it may be removed entirely. It should also be appreciated that analytics and processing techniques described herein with respect to the optical measurements, for example, may also be performed partially or in full by these or other various components of the overall system or apparatus (e.g., apparatus 100).

It should be appreciated that data stores may also be provided to the apparatuses, systems, and methods described herein, and may include volatile and/or nonvolatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces, may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to test and measurement systems, such as optical spectrum analyzers (OSAs), it should be appreciated that the systems and methods described herein may also be used in other various systems and other implementations. For example, these may include an ultra-narrow band tunable filter, an extended cavity diode laser, and/or applied stages to further increase the spectral resolution of various test and measurement systems. In fact, there may be numerous applications in optical communication networks and fiber sensor systems that could employ the systems and methods as well.

It should be appreciated that the apparatuses, systems, and methods described herein may also be used to help provide, directly or indirectly, measurements for distance, angle, rotation, speed, position, wavelength, transmissivity, and/or other related optical measurements. For example, the systems and methods described herein may allow for a higher resolution optical resolution using an efficient and cost-effective design concept. With additional advantages that include higher resolution, lower number of optical elements, more efficient processing techniques, cost-effective configurations, and smaller or more compact form factor, the apparatuses, systems, and methods described herein may be beneficial in many original equipment manufacturer (OEM) applications, where they may be readily integrated into various and existing network equipment, fiber sensor systems, test and measurement instruments, or other systems and methods. The apparatuses, systems, and methods described herein may provide mechanical simplicity and adaptability to small or large optical measurement devices.

Ultimately, the apparatuses, systems, and methods described herein may increase resolution, minimize adverse effects of traditional systems (e.g., using simple design and configurations), and improve measurement and processing efficiencies.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. An apparatus, comprising:
   a coupling link comprising a first end, a second end, and a middle section, wherein:
   the middle section is connectable to a beam blocking element; and
   the first end comprises a first bearing assembly and is connectable to a motor drive arm; and
   the second end comprises a second bearing assembly and is connectable to an optical-mechanical element.

2. The apparatus of claim 1, wherein the coupling link comprises a parallel beam flexure configuration, wherein the middle section comprises a thin flexure section to manage coplanarity deviations caused by the first end or the second end.

3. The apparatus of claim 1, wherein the coupling link is made from an elastic material.

4. The apparatus of claim 1, wherein the beam blocking element is connectable to a beam blocking element attachment area on in the middle section of the coupling link, such that during actuation of the coupling link, the beam blocking element blocks, reflects, or allows passage of an optical beam.

5. The apparatus of claim 1, wherein the beam blocking element is made from an opaque material.

6. The apparatus of claim 1, wherein the first end and the second end of the coupling link each comprises a bearing assembly.

7. The apparatus of claim 6, wherein the bearing assembly is a ball bearing assembly.

8. The apparatus of claim 7, wherein the ball bearing assembly comprises balls and raceways, such that an axial preloading technique is applied to manage at least one of radial or axial play in the ball bearing assembly.

9. The apparatus of claim 1, wherein the motor drive arm is connectable to a motor, such that operation of the motor causes actuation of the motor drive arm and the coupling link.

10. The apparatus of claim 1, wherein the optical-mechanical element comprises a retroreflective element.

11. The apparatus of claim 1, wherein the coupling link is used in an optical spectrum analyzer (OSA) system.

12. A method for managing movement in a bearing assembly, comprising:
    providing an axial preloading technique to the bearing assembly, wherein the axial preloading technique manages issues associated with radial and axial play by providing a more secure fit and reducing looseness or movement in the bearing assembly.

13. The method of claim 12, wherein the axial preloading technique comprises:
    adhering, using a first adhesive, inner races of bearings to a shaft;
    adhering, using a second adhesive, outer races of bearings to an upper flexure arm of a coupling link;
    applying dead weight to a lower flexure arm of the coupling link while supporting lower bearings; and
    placing a third adhesive between lower bearing out race and lower flexure arm.

14. The method of claim 13, further comprising removing the dead weight from the lower flexure arm.

15. The method of claim 13, wherein the first adhesive, second adhesive, and third adhesive each comprise at least one of Loctite, glue, sealant, or epoxy.

16. An apparatus, comprising:
    a coupling link that is connectable to a beam blocking element, and comprises a first ball bearing assembly connectable to a motor drive arm and a second ball bearing assembly connectable to a retroreflective element, wherein the motor drive arm is connectable to a motor, such that operation of the motor causes actuation of the motor drive arm and the coupling link.

17. The apparatus of claim 16, wherein the coupling link comprises a parallel flexure configuration, wherein a middle section of the coupling link comprises a thin flexure section to manage coplanarity deviations.

18. The apparatus of claim 16, wherein the beam blocking element blocks, reflects, or allows passage of an optical beam.

19. The apparatus of claim 16, wherein the first ball bearing assembly and the second ball bearing assembly each comprises balls and raceways, such that an axial preloading technique is applied to manage at least one of radial or axial play in at least one of the first ball bearing assembly or the second ball bearing assembly.

20. The apparatus of claim 16, wherein the coupling link is used in an optical spectrum analyzer (OSA) system.

* * * * *